Patented Nov. 7, 1922.

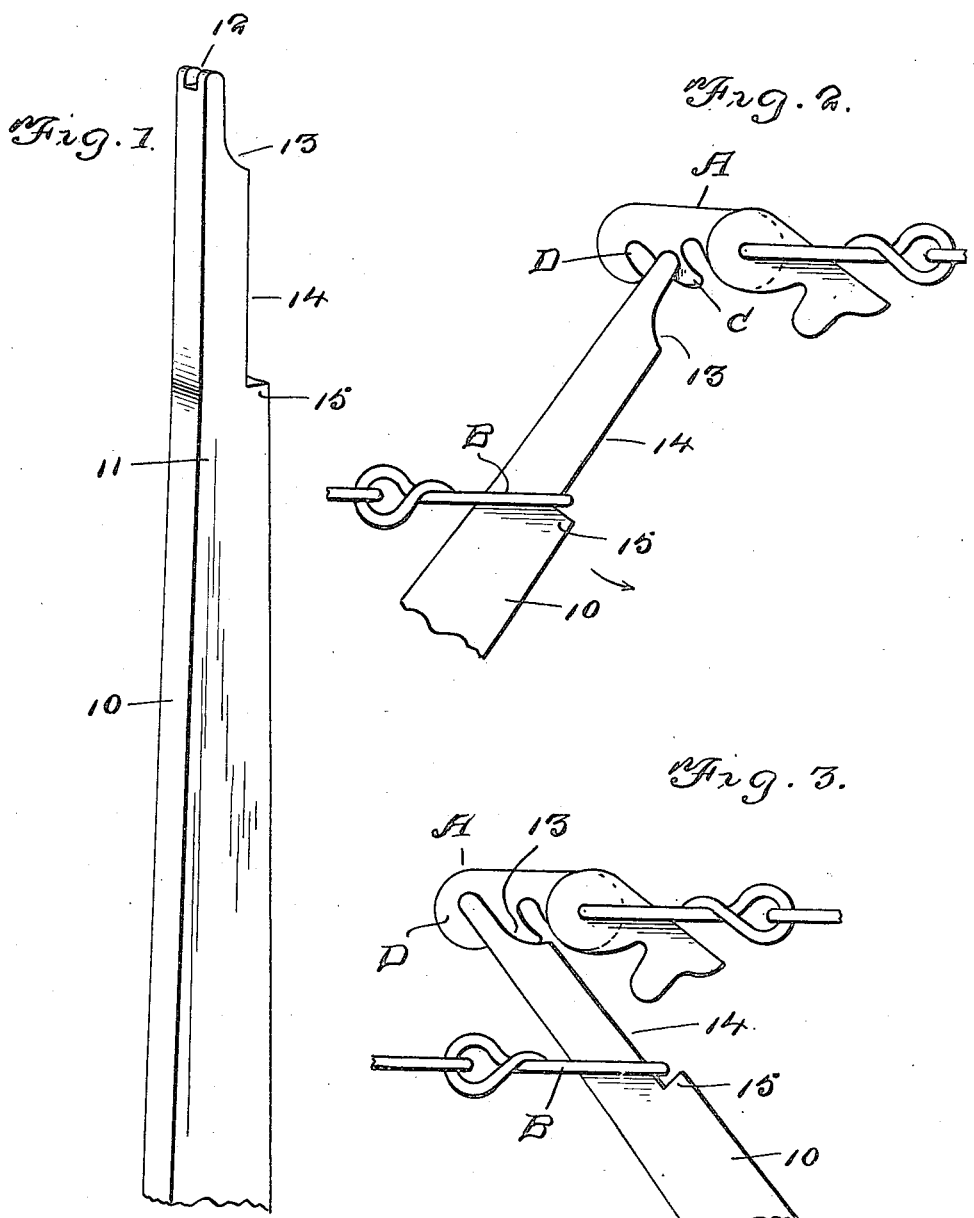

1,435,099

UNITED STATES PATENT OFFICE.

MAURICE E. BELTZ, OF BUXTON, NORTH DAKOTA.

CHAIN-TIGHTENING TOOL.

Application filed October 12, 1920. Serial No. 416,351.

*To all whom it may concern:*

Be it known that I, MAURICE E. BELTZ, a citizen of the United States, residing at Buxton, in the county of Traill and State of North Dakota, have invented new and useful Improvements in Chain-Tightening Tools, of which the following is a specification.

This invention relates to tools used in placing anti-skid chains upon automobile tires and has for its object the provision of a tool for drawing the ends of a non-skid chain together so that the chain may be fastened tightly about the tire.

An important object is the provision of a tool of this character which is formed as a single lever engageable with one end of the chain and adapted to be fulcrumed upon the usual hook carried at the other end of the chain whereby when the lever is preferably swung the chain may be engaged upon the hook in taut condition.

An additional object is the provision of a device of this character which will be simple and inexpensive in manufacture, easy to use, efficient in operation, durable in service, and a general improvement in the art.

With the above and other objects and advantages in view, the invention consists in the details of construction to be hereinafter more fully described and claimed and illustrated in the accompanying drawings in which—

Figure 1 is a perspective view of my tool,

Figure 2 is a side elevation thereof showing its initial position in tightening a chain, and Figure 3 is a similar view showing the lever as swung to tighten the chain.

Referring more particularly to the drawings, I have shown my tool as formed from a single bar 10 of steel and of any desired length which may be found most advantageous. It is preferable that this bar be wider at its handle end than at its active end and this latter mentioned end is greatly reduced, as shown at 11, and formed as a fork 12. Adjacent this forked end the lever is formed curved, as shown at 13, to define a tongue of a size and shape to fit within a notch of the usual chain securing hook A such as is commonly provided on anti-skid chains. At a point spaced from the curved edge 13 the lever is cut away, as shown, to define a reduced portion 14 and a shoulder 15.

The operation of the device is as follows:

The chain is of course placed upon the automobile wheel or tire in the usual manner whereupon the operator inserts the reduced portion 14 of the lever through the link B at the end of the chain opposite that carrying the hook A. The fork 12 is then engaged against the second tooth C of the hook A and the operator then swings the lever in the direction of the arrow in Figure 2, upon the fork as a fulcrum and this will of course result in drawing the ends of the chain together into the position shown in Figure 3, the shoulder 15 preventing the chain from slipping along the lever toward the handle end thereof. When the parts are in the position shown in Figure 3, the reduced forked end 11 of the lever will have slid into the first notch D of the hook member A and will conformingly engage therein so that the edge of the reduced portion 14 of the lever will extend in alignment with the edge of the second notch of the hook A, as clearly shown in Figure 3. When the lever reaches this position the link B will of course slide along the reduced portion 14 and engage within the second notch. After this is done the movable retaining member E of the hook structure is swung into engagement with the body of the hook to prevent disengagement of the link B.

From the foregoing description and a study of the drawings it will be apparent that I have thus provided a very simple and inexpensive lever tool for tightening anti-skid chains, the device being quickly and easily operable and requiring very little effort in its manipulation.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A tool of the character described comprising a lever having one end reduced in width and rounded and forked with one edge cut away along a curve to define a tongue adapted to conformingly engage within the notch of a chain fastening hook, said lever being reduced from the curve to a point spaced from said curve to define a somewhat reduced portion engageable within a link and to further define a retaining shoulder adapted for initial engagement of the free end of the chain to be fastened.

In testimony whereof I affix my signature.

MAURICE E. BELTZ.